(12) United States Patent
Hahnfeld et al.

(10) Patent No.: US 6,455,656 B2
(45) Date of Patent: Sep. 24, 2002

(54) PROCESS FOR PREPARING HYDROGENATED AROMATIC POLYMERS

(75) Inventors: Jerry L. Hahnfeld; Thomas H. Newman; Avani M. Patel, all of Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/793,185

(22) Filed: Feb. 26, 2001

Related U.S. Application Data

(60) Provisional application No. 60/194,159, filed on Apr. 3, 2000, and provisional application No. 60/199,608, filed on Apr. 25, 2000.

(51) Int. Cl.$^7$ .................................................. L08F 8/04
(52) U.S. Cl. ................ 526/338; 525/332.9; 525/333.3; 525/339
(58) Field of Search .................................. 525/338, 339

(56) References Cited

U.S. PATENT DOCUMENTS

| | | | |
|---|---|---|---|
| 3,957,914 A | * | 5/1976 | Baumgartner ............... 525/314 |
| 4,452,591 A | | 6/1984 | Fishbaugh et al. |
| 4,602,072 A | | 7/1986 | Wallace et al. |
| 5,700,878 A | | 12/1997 | Hucul et al. |

FOREIGN PATENT DOCUMENTS

| | | |
|---|---|---|
| DE | 19855062 | 8/2000 |
| WO | 96/35896 | 11/1996 |
| WO | 01/12681 A1 | 2/2001 |

\* cited by examiner

*Primary Examiner*—Bernard Lipman

(57) ABSTRACT

The present invention is directed to a process for producing a hydrogenated polymer or copolymer by hydrogenating prior to polymer isolation or finishing.

13 Claims, No Drawings

PROCESS FOR PREPARING HYDROGENATED AROMATIC POLYMERS

CROSS REFERENCE STATEMENT

This application claims the benefit of U.S. Provisional Application No. 60/194,159, filed Apr. 3, 2000 and U.S. Provisional Application No. 60/199,608, filed Apr. 25, 2000.

The present invention is directed to a process for preparing hydrogenated aromatic polymers.

BACKGROUND OF THE INVENTION

Hydrogenated aromatic polymers have been produced by a variety of processes and hydrogenation techniques. Methods of hydrogenating aromatic polymers are well known in the art, such as that described in U.S. Pat. No. 5,700,878 by Hahn and Hucul, wherein aromatic polymers are hydrogenated by contacting the aromatic polymer with a hydrogenating agent in the presence of a heterogeneous metal hydrogenation catalyst. Typically, this process includes hydrogenation of a previously prepared and isolated polymer. The polymer is then dissolved in a hydrogenation processing solvent and purified prior to hydrogenation. However, this process suffers from poor catalyst efficiency due to catalyst poisoning from toxins, such as stabilizers, introduced during the polymerization process or finishing steps.

Therefore, there remains a need for a process of producing hydrogenated aromatic polymers with increased hydrogenation catalyst efficiency.

SUMMARY OF THE INVENTION

The present invention is directed to a process for producing a hydrogenated polymer or copolymer comprising:

a) preparing a solution comprising at least one vinyl aromatic monomer and a solvent;

b) subjecting the solution to polymerization conditions such that the vinyl aromatic monomer polymerizes, forming an aromatic polymer solution of an aromatic polymer and a solvent;

c) optionally, purifying the aromatic polymer solution, and d) subjecting the aromatic polymer solution to hydrogenation conditions such that aromatic hydrogenation is achieved, wherein the aromatic polymer is not isolated prior to hydrogenation.

Surprisingly, this integrated process has lower hydrogenation catalyst poisoning when compared to processes wherein hydrogenation of an isolated aromatic polymer occurs. Thus the hydrogenation catalyst can be isolated and re-used in other hydrogenation reactions.

DETAILED DESCRIPTION OF THE INVENTION

The present invention relates to an integrated process wherein polymerization is followed by hydrogenation without isolation of the polymer prior to hydrogenation. The polymers to be hydrogenated can be made by any acceptable polymerization process, but are typically prepared by anionic polymerization. Anionic polymerization of vinyl aromatic monomers is known in the art and exemplified in U.S. Pat. Nos. 4,942,209 and 4,871,814, which are herein incorporated by reference. Anionic suspension polymerization is disclosed in WO96/27623. Anionic polymerization is well known in the art as a polymerization wherein a color change occurs when polymerization takes place under the influence of an anionic initiator. Representative polymerization systems are set forth in the following U.S. Pat. Nos.: 2,975,160; 3,030,346; 3,031,432; 3,139,416; 3,157,604; 3,159,587; 3,231,635; 3,498,960; 3,590,008; 3,751,403; 3,954,894; 4,183,877; 4,196,153; 4,196,154; 4,200,713; 4,205,016; 4,859,748; the teachings of which are hereby incorporated by reference thereto.

Vinyl aromatic monomers to be polymerized include, but are not limited to those described in U.S. Pat. Nos. 4,666,987, 4,572,819 and 4,585,825, which are herein incorporated by reference. Preferably, the monomer is of the formula:

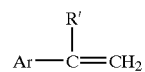

wherein R is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. Homopolymers may have any stereostructure including syndiotactic, isotactic or atactic; however, atactic polymers are preferred.

In addition, a comonomer(s) can be polymerized with the vinyl aromatic monomer to prepare copolymers including random, pseudo random, block and grafted copolymers. For example, hydrogenated copolymers of at least one vinyl aromatic monomer(s) and at least one comonomer selected from: nitrites, acrylates, acids, ethylene, propylene, maleic anhydride, maleimides, vinyl acetate, and vinyl chloride may also be prepared. Exemplary copolymers include styrene-acrylonitrile, styrene-alpha-methylstyrene and styrene-ethylene. Block copolymers of vinyl aromatic monomers and conjugated dienes such as butadiene, isoprene may also be prepared. The conjugated diene monomer can be any monomer having 2 conjugated double bonds. Such monomers include for example 1,3-butadiene, 2-methyl-1,3-butadiene, 2-methyl-1,3 pentadiene, isoprene and similar compounds, and mixtures thereof. Further examples of block copolymers may be found in U.S. Pat. Nos. 4,845,173, 4,096,203, 4,200,718, 4,210,729, 4,205,016, 3,652,516, 3,734,973, 3,390,207, 3,231,635, and 3,030,346. Blends of such polymers with other polymers including impact modified, grafted rubber containing aromatic polymers may also be prepared. In addition, the polymerization of the vinyl aromatic monomer may be conducted in the presence of predissolved elastomer to prepare impact modified, or grafted rubber containing products, examples of which are described in U.S. Pat. Nos. 3,123,655, 3,346,520, 3,639,522, and 4,409,369, which are incorporated by reference herein.

In one embodiment, the polymer is a vinyl aromatic-conjugated diene block copolymer, wherein the conjugated diene polymer block is chosen from materials which remain amorphous after the hydrogenation process, or materials which are capable of crystallization after hydrogenation.

Hydrogenated polyisoprene blocks remain amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provides substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. Methods of modifying the 1,2-butadiene content are well known by those skilled in the art. Depending on the final application of the polymer it may be desirable to incorporate a crystalline block (to improve solvent resistance) or an amorphous, more compliant block. The conjugated diene polymer block may also be a copolymer of a conjugated diene, wherein the conjugated diene portion of the copolymer is at least 50 weight percent of the copolymer.

A block is herein defined as a polymeric segment of a copolymer which exhibits microphase separation from a structurally or compositionally different polymeric segment of the copolymer. Microphase separation occurs due to the incompatibility of the polymeric segments within the block copolymer. Microphase separation and block copolymers are widely discussed in "Block Copolymers-Designer Soft Materials", PHYSICS TODAY, February, 1999, pages 32–38.

The vinyl aromatic monomer is contacted with an anionic initiator which is typically an organometallic anionic polymerization initiating compound. The initiator is typically an alkyl or aryl alkali metal compound, particularly lithium compounds with $C_{1-6}$ alkyl, $C_6$ aryl, or $C_{7-20}$ alkylaryl groups. Such initiators can be monofunctional or polyfunctional metal compounds including the multifunctional compounds described, in U.S. Pat. Nos. 5,171,800 and 5,321,093, which are incorporated herein by reference. It is advantageous to use organolithium compounds such as ethyl-, propyl-, isopropyl-, n-butyl-, sec.-butyl-, tert.-butyl, phenyl-, hexyl-diphenyl-, butadienyl-, polystyryl-lithium, or the multifunctional compounds hexamethylene-dilithium, 1,4-dilithium-butane, 1,6-dilithium-hexane, 1,4-dilithium-2-butene, or 1,4-dilithium-benzene. Preferably, the initiator is n-butyl- and/or sec.-butyl-lithium.

The amount of initiator is well known in the art and can easily be ascertained by one skilled in the art without undue experimentation.

In a continuous process for the preparation of homopolymers, the polymerization of the vinyl aromatic monomer may also be conducted in the presence of a di- or tri-valent alkyl metal compound as taught in WO98/07765 or salt thereof. These compounds act as rate regulators or retarders and are typically a compound containing an element of groups IIA, IIB, or IIIA of the periodic table. Typically, the compound contains an alkaline earth metal, zinc, magnesium or aluminum. Preferably, the compound is a $C_{1-6}$ alkyl or $C_6-C_{20}$ aryl alkaline earth, zinc or aluminum compound. It is also possible to use an aryl metal hydride such as dibutyl-aluminum hydride. More preferably, alkyl magnesium, alkyl aluminum or alkyl zinc compounds are used, in particular methyl, ethyl, propyl, butyl, hexyl, octyl or dodecyl-compounds. Particularly preferred regulators include butyl-ethyl-magnesium, dibutyl-magnesium, butyl-octyl-magnesium, dihexyl-magnesium, diethyl-zinc, dibutyl-zinc, trimethyl-aluminum, triethyl-aluminum, tri-isobutyl-aluminum, tri-n-hexyl-aluminum, di-isobutyl-aluminum hydride, or mixtures thereof. Any mixture of the above mentioned regulators may be used in the process of the present invention.

Additionally, the regulator can be an alkyl or aryl mixed metal or salt thereof. Typically, the compound contains at least two of the following: alkaline earth metal, zinc, magnesium or aluminum. Preferably, the compound is a $C_{1-6}$ alkyl or $C_6-C_{20}$ aryl compound also containing an alkaline earth, zinc or aluminum, wherein at least 2 different metals are present. Examples of preferred mixed metal compounds include dibutyl magnesium:diethyl aluminum, diethylmagnesium:diethylaluminum, and dibutylmagnesium:diisobutylaluminum complexes. Such complexes are commercially available and known in the art. In addition to mixed metal complexes, alkyl and aryl ligands can be exchanged for oxy, alkoxy, or thioalkyl. For example, methylalumoxane can be prepared by adding water to trimethylaluminum giving a $Me_xAl_yO_z$ structure. Mixed metal complexes can also be prepared by reacting the mixed metal alkyl or aryl complex with reagents such as alcohols, or thiols. Examples of metal salts with non-hydrocarbon ligands include diethylaluminumphenoxide, diisobutylaluminum oxide, diethylaluminum methoxide and diethylaluminum thiophenol. Any mixture of the above mentioned regulators may be used in the process of the present invention.

The initiator and rate regulator can be utilized in the process of the present invention as an initiator mixture. Such an initiator mixture is preferably used in the absence of a Lewis base (i.e., no Lewis base is added) and may contain, for instance, A: an alkyl or aryl metal A of formula $R^1M^1$, B: an alkyl or aryl metal B of formula $(R^2)_nM^2$; an alkyl or aryl mixed metal; or salt thereof as described previously, wherein $M^1$: is Li, Na or K;

$R^1$: is hydrogen, $C_1-C_6$-alkyl or $C_6-C_{20}$-aryl, $C_7-C_{20}$-alkyl-substituted aryl;

$M^2$: is an n-valent (n=2 or 3) element of group Ia, IIb or IIIa of the periodic table, and $R^2$: is hydrogen, halogen, $C_1-C_6$-alkyl or $C_6-C_{20}$-aryl, wherein when n is $\geq 2$, each $R^2$ may be the same or different, and wherein the molar ratio of B to A is, from 10:1 to 100:1.

Additionally, component A can also be a low-molecular weight reaction product A' of the alkyl or aryl metal, capable of acting as initiator and having the general formula $R^3(M^3)_x$, where x is an integer from 2 to 5 and $R^3$ is an aliphatic, aromatic-aliphatic or aromatic hydrocarbon having a valency of x. Some suitable products $R^3(M^3)_x$ are formed, for instance, in the reaction of small amounts of multiply vinylated aromatic compounds with alkali metal-alkyl, or can be obtained directly by reaction of an alkali metal with polyaryl compounds. With these reaction products, bifunctional or multifunctional polymers—such as linear or radial block copolymers—can be manufactured in a per se known manner.

The rate regulator is typically used in a molar ratio of 0.1:1 to 500:1, preferably from 0.5:1 to 100:1, and more preferably from 0.8:1 to 30:1, relative to the amount of initiator. In the case of multifunctional initiators, these values are naturally relative to one equivalent of the corresponding metal compound.

Generally, the different rate regulators are used in each case in specific mass ratios. For instance, for dibutyl-magnesium, the initiator/retarder ratio is from 1:0.1 to 1:500, preferably from 1:0.5 to 1:200, and more preferably from 1:1 to 1;50. Trimethyl, triethyl and tri-isobutyl-aluminum and di-isobutyl-aluminum hydride are preferably used in an initiator/retarder ratio of from 1:0.1 to 1:1, preferably from 1:0.4 to 1:0.99, and more preferably from 1:0.7 to 1:0.98. Trihexyl-aluminum is preferably used in an initiator/retarder ratio of from 1:0.5 to 1:500, preferably from 1:0.8 to 1:100, and more preferably from 1:1 to 1:30.

It is advantageous to perform a preliminary experiment for the precise determination of the retarder/initiator ratio for each case and then selecting the amount of retarder in such a way that the desired reaction temperature, or reaction rate, respectively, is not exceeded.

The polymerization is typically conducted in the presence of a saturated hydrocarbon solvent or ether, benzene, toluene, xylene or ethylbenzene, but is preferably a hydrocarbon, such as cyclohexane or methylcyclohexane. The amount of solvent used in the polymerization step of the process of the present invention is typically from 50 to 90 percent by weight based on the total weight of the monomer/solvent mixture.

Polymerization of the vinyl aromatic monomer can be conducted in a continuous polymerization reactor of the plug flow or backmixed type as described in U.S. Pat. Nos. 2,745,824; 2,989,517; 3,035,033; 3,747,899; 3,765,655; 4,859,748 and 5,200,476, which are incorporated herein by reference, The temperature at which the polymerization is conducted will vary according to the specific components, particularly initiator, but will generally vary from about 60 to about 140° C.

Typically, after polymerization, a polymer solution is subjected to finishing steps such as devolatilization at high temperature to remove solvent, residual monomer and the like. Stabilizers may also be added to minimize degradation and gel formation during processing. However, in the process of the present invention the polymer solution is prepared for hydrogenation without experiencing such finishing steps.

However, the aromatic polymer and solvent solution can be additionally and optionally subjected to a purification step prior to hydrogenation. One such purification process includes an activated alumina bed. Such processes are well known in the art as processes for removing organic compounds containing oxygen, nitrogen and sulfur including polymerization terminators, salts, polar modifiers and antioxidants. Any process which achieves such removal can be used in the process of the present invention.

Block copolymers of vinyl aromatic monomers can also be used in the process of the present invention. Methods of making block copolymers by anionic polymerization are well known in the art, examples of which are cited in *Anionic Polymerization: Principles and Practical Applications,* H. L. Hsieh and R. P. Quirk, Marcel Dekker, New York, 1996. In one embodiment, block copolymers are made by sequential monomer addition to a carbanionic initiator such as sec-butyl lithium or n-butyl lithium. In another embodiment, a pentablock copolymer can be made by coupling a triblock material with a divalent coupling agent such as 1,2-dibromoethane, dichlorodimethylsilane, or phenylbenzoate. In this embodiment, a small chain (less than 10 monomer repeat units) of a conjugated diene polymer can be reacted with the vinyl aromatic polymer coupling end to facilitate the coupling reaction. Vinyl aromatic polymer blocks are typically difficult to couple, therefore, this technique is commonly used to achieve coupling of the vinyl aromatic polymer ends. The small chain of diene polymer does not constitute a distinct block since no microphase separation is achieved. The coupled structure achieved by this method is considered to be the functional equivalent of the ABABA pentablock copolymer structure. Coupling reagents and strategies which have been demonstrated for a variety of anionic polymerizations are discussed in Hsieh and Quirk, Chapter 12, pgs. 307–331. In another embodiment, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. Nos. 4,200,718 and 4,196,154, which are herein incorporated by reference.

Methods of hydrogenating aromatic polymers are well known in the art such as that described in U.S. Pat. No. 5,700,878 by Hahn and Hucul, wherein aromatic polymers are hydrogenated by contacting the aromatic polymer with a hydrogenating agent in the presence of a silica supported metal hydrogenation catalyst having a narrow pore size distribution and large pores.

Alternatively, the polymer solution can be hydrogenated using a mixed hydrogenation catalyst. The mixed hydrogenation catalyst is characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. Preferably rhodium and/or platinum is used. However, platinum is known to be a poor hydrogenation catalyst for nitrites, therefore, platinum would not be preferred in the hydrogenation of nitrile copolymers. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of the deactivation resistant component is at least an amount which significantly inhibits the deactivation of the Group VIII metal component when exposed to polar impurities within a polymer composition, herein referred to as a deactivation inhibiting amount. Deactivation of the Group VIII metal is evidenced by a significant decrease in hydrogenation reaction rate. This is exemplified in comparisons of a mixed hydrogenation catalyst and a catalyst containing only a Group VIII metal component under identical conditions in the presence of a polar impurity, wherein the catalyst containing only a Group VIII metal component exhibits a hydrogenation reaction rate which is less than 75 percent of the rate achieved with the mixed hydrogenation catalyst.

Preferably, the amount of deactivation resistant component is such that the ratio of the Group VIII metal component to the deactivation resistant component is from 0.5:1 to 10:1, more preferably from 1:1 to 7:1, and most preferably from 1:1 to 5:1.

The catalyst can consist of the components alone, but preferably the catalyst additionally comprises a support on which the components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used.

The pore size distribution, pore volume, and average pore diameter of the support can be obtained via mercury porosimetry following the proceedings of ASTM D-4284-83.

The pore size distribution is typically measured using mercury porosimetry. However, this method is only sufficient for measuring pores of greater than 60 angstroms. Therefore, an additional method must be used to measure pores less than 60 angstroms. One such method is nitrogen desorption according to ASTM D-4641-87 for pore diameters of less than about 600 angstroms. Therefore, narrow pore size distribution is defined as the requirement that at least 98 percent of the pore volume is defined by pores having pore diameters greater than 300 angstroms and that the pore volume measured by nitrogen desorption for pores less than 300 angstroms, be less than 2 percent of the total pore volume measured by mercury porosimetry.

The surface area can be measured according to ASTM D-3663-84. The surface area is typically between 10 and 100 $m^2/g$, preferably between 15 and 90 with most preferably between 50 and 85 $m^2/g$.

The desired average pore diameter is dependent upon the polymer which is to be hydrogenated and its molecular weight (Mn). It is preferable to use supports having higher average pore diameters for the hydrogenation of polymers having higher molecular weights to obtain the desired amount of hydrogenation. For high molecular weight polymers (Mn>200,000 for example), the typical desired surface area can vary from 15 to 25 $m^2/g$ and the desired average pore diameter from 3,000 to 4000 angstroms. For lower molecular weight polymers (Mn<100,000 for example), the typical desired surface area can vary from 45 to 85 $m^2/g$ and the desired average pore diameter from 300 to 700 angstroms although larger pore diameters are also acceptable.

Silica supports are preferred and can be made by combining potassium silicate in water with a gelation agent, such as formamide, polymerizing and leaching as exemplified in U.S. Pat. No. 4,112,032. The silica is then hydrothermally calcined as in Iler, R. K., *The Chemistry of Silica,* John Wiley and Sons, 1979, pp. 539–544, which generally consists of heating the silica while passing a gas saturated with water over the silica for about 2 hours or more at temperatures from about 600° C. to about 850° C. Hydrothermal calcining results in a narrowing of the pore diameter distribution as well as increasing the average pore diameter. Alternatively, the support can be prepared by processes disclosed in Iler, R. K., *The Chemistry of Silica,* John Wiley and Sons, 1979, pp. 510–581.

A silica supported catalyst can be made using the process described in U.S. Pat. No. 5,110,779, which is incorporated herein by reference. An appropriate metal, metal component, metal containing compound or mixtures thereof, can be deposited on the support by vapor phase deposition, aqueous or nonaqueous impregnation followed by calcination, sublimation or any other conventional method, such as those exemplified in *Studies in Surface Science and Catalysis,* "Successful Design of Catalysts" V. 44, pg. 146–158, 1989 and *Applied Heterogeneous Catalysis* pgs. 75–123, Institute Français du Pétrole Publications, 1987. In methods of impregnation, the appropriate metal containing compound can be any compound containing a metal, as previously described, which will produce a usable hydrogenation catalyst which is resistant to deactivation. These compounds can be salts, coordination complexes, organometallic compounds or covalent complexes.

Typically, the total metal content of the supported catalyst is from 0.1 to 10 wt. percent based on the total weight of the silica supported catalyst. Preferable amounts are from 2 to 8 wt. percent, more preferably 0.5 to 5 wt. percent based on total catalyst weight.

Promoters, such as alkali, alkali earth or lanthanide containing compounds, can also be used to aid in the dispersion of the metal component onto the silica support or stabilization during the reaction.

The amount of supported catalyst used in the hydrogenation process is much smaller than the amount required in conventional unsaturated polymer hydrogenation reactions due to the high reactivity of the hydrogenation catalysts. Generally, amounts of less than 1 gram of supported catalyst per gram of unsaturated polymer are used, with less than 0.5 gram being preferred and less than 0.2 being more preferred. The amount of supported catalyst used is dependent upon the type of process, whether it is continuous, semi-continuous or batch, and the process conditions, such as temperature, pressure and reaction time wherein typical reaction times may vary from about 5 minutes to about 5 hours. Continuous operations can typically contain 1 part by weight supported catalyst to 200,000 or more parts unsaturated polymer, since the supported catalyst is reused many times during the course of continuous operation. Typical batch processes can use 1 part by weight supported catalyst to 15 parts unsaturated polymer. Higher temperatures and pressures will also enable using smaller amounts of supported catalyst.

The hydrogenation reaction is preferably conducted in a hydrocarbon solvent in which the polymer is soluble and which will not hinder the hydrogenation reaction. The solvent is preferably the same solvent in which the polymerization was conducted. Typically, the polymer solution obtained from the polymerization step is diluted further with additional solvent prior to hydrogenation. Typically, the polymer solution contains from 10 to 25 wt. percent, preferably from 10 to 20 wt. percent polymer based on the total weight of the solution prior to hydrogenation. Preferably the solvent is a saturated solvent such as cyclohexane, methylcyclohexane, ethylcyclohexane, cyclooctane, cycloheptane, dodecane, dioxane, branched hydrocarbons, especially branched hydrocarbons which have no more than one hydrogen atom at the branch point, a boiling temperature of more than 45° C. and an ignition temperature greater than 280° C., isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer can be detected by a decrease in Mn, an increase in polydispersity or a decrease in glass transition temperature, after hydrogenation. Significant degradation in polymers having a polydispersity between 1.0 and about 1.2 can be defined as an increase of 30 percent or more in polydispersity after hydrogenation. Preferably, polymer degradation is such that less than a 20 percent increase in polydispersity occurs after hydrogenation, most preferably less than 10 percent. In polymers having polydispersity greater than about 1.2, a significant decrease in molecular weight after hydrogenation indicates that degradation has occurred. Significant degradation in this case is defined as a decrease in Mn of 20 percent or more. Preferably, a Mn decrease after hydrogenation will be less than 10 percent. However, polymers such as poly-alpha-methylstyrene or other alpha substituted vinyl aromatic polymers which are more prone to polymer degradation, can tolerate a decrease in Mn of up to 30 percent.

Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred.

The reaction vessel is purged with an inert gas to remove oxygen from the reaction area. Inert gases include but are not limited to nitrogen, helium, and argon, with nitrogen being preferred.

The hydrogenating agent can be any hydrogen producing compound which will efficiently hydrogenate the unsaturated polymer. Hydrogenating agents include but are not limited to hydrogen gas, hydrazine and sodium borohydride. In a preferred embodiment, the hydrogenating agent is hydrogen gas.

The amount of olefinic hydrogenation can be determined using Infrared or proton NMR techniques. The amount of aromatic hydrogenation can be measured using UV-VIS spectroscopy. Cyclohexane solutions of polystyrene give a very distinct absorption band for the aromatic ring at about 260.5 nm. This band gives an absorbance of 1.000 with a solution concentration of 0.004980 moles of aromatic per liter in a 1 cm cell. After removing the catalyst via filtration (using a 0.50 micrometer ($\mu$m) "TEFLON™" filter, Millipore FHUP047) the reaction mixture is placed in a UV cell and the absorbance measured. The absorbance is dependent upon concentration. The hydrogenated polymer products are typically measured at higher concentrations since they are not diluted before the absorbance is measured. Since the reaction solution is about 15–30 times more concentrated than the standards, small amounts of residual unsaturation can be accurately measured.

Typical aromatic hydrogenation levels for the hydrogenated polymer produced can range from 20 to 100 percent. Preferably, the polymers produced by the process of the present invention are those which have been hydrogenated to a level of at least 80 percent aromatic hydrogenation, generally at least 85 percent, typically at least 90 percent, advantageously at least 95 percent, more advantageously at least 98 percent, preferably at least 98 percent, more preferably at least 99.5 percent, and most preferably at least 99.8 percent. The term 'level of hydrogenation' refers to the percentage of the original unsaturated bonds which become saturated upon hydrogenation. The level of hydrogenation in hydrogenated vinyl aromatic polymers is determined using UV-VIS spectrophotometry, while the level of hydrogenation in hydrogenated diene polymers is determined using proton NMR.

The weight average molecular weight (Mn) of the aromatic polymers which are hydrogenated is typically from 10,000 to 3,000,000, more preferably from 50,000 to 1,000,000, and most preferably from 50,000 to 500,000. As referred to herein, Mn refers to the number average molecular weight as determined by gel permeation chromatography (GPC).

The hydrogenated polymer is then optionally isolated by subjecting the hydrogenated polymer solution to a finishing process such as devolatilization. Any conventional finishing process can be used to isolate the hydrogenated polymer produced.

The following examples are provided to illustrate the present invention. The examples are not intended to limit the scope of the present invention and they should not be so interpreted. Amounts are in weight parts or weight percentages unless otherwise indicated.

EXAMPLES

Example 1

Cyclohexane (1979 grams) is loaded into a 8 liter reactor and heated to 70° C. Styrene monomer (137 grams) and 4.0 mL of a 1.3 Molar solution of sec-butyllithium are added to the reactor. After 20 minutes, 48 grams of butadiene are added, followed by a second addition of 137 grams of styrene after an additional 20 minutes. After an additional 30 minutes, the reactor is cooled to 50° C. and the reaction is quenched with a stoichiometric amount of isopropanol. The final concentration is 14% SBS copolymer by weight with a molecular weight of 63,500.

The solution is directly transferred through an alumina column into a hydrogenation reactor. The hydrogenation is conducted at 150° C. and 6.2 MPa H2 pressure using a 5% platinum on ultra wide pore silica catalyst at a loading of 0.65% by weight based on the total block copolymer solution. After approximately 0.5 hours, greater than 99% hydrogenation is achieved.

Example 2

An SBS triblock copolymer is prepared as in Example 1. A sample of polymer is obtained directly from the anionic reactor after termination with isopropanol under inert atmosphere. The sample is 25% solids containing 42% styrene and has a number average molecular weight of 60,000. The sample is diluted to 15% solids with cyclohexane and transferred through an activated alumina bed to a hydrogenation reactor. The catalyst is a platinum/rhenium alloy on ultra wide pore silica obtained from Engelhard. A 1 wt. % catalyst loading, based on the total polymer solution, is used and the reaction is conducted at 155° C. and 6.2 MPa hydrogen pressure. The product is filtered and the catalyst returned to the reactor for subsequent hydrogenations. Five hydrogenation runs are conducted using the same catalyst, without loss in catalyst activity. All five runs reach greater than 99.9% hydrogenation.

Comparative Example

SBS triblock copolymer (Vector™ 6241 available from Dexco) is obtained as isolated polymer pellets. A 15 wt. % solution of this polymer in cyclohexane is prepared. This sample is transferred through an activated alumina bed to a hydrogenation reactor. The hydrogenation catalyst is a platinum/rhenium alloy on ultra wide pore silica obtained from Engelhard as in example 2. A 1% catalyst loading, based on the total polymer solution, is used and the reaction is conducted at 155° C. and 6.2 MPa hydrogen pressure. After approximately five hours greater than 99% hydrogenation is obtained. The product is filtered and the catalyst returned to the reactor for subsequent hydrogenations. After 30 hours under identical reaction conditions, less than 90% hydrogenation is obtained in the second hydrogenation using the same catalyst.

Therefore, it is clear that catalyst activity is enhanced by the direct hydrogenation of the polymer solution, without prior polymer isolation.

What is claimed is:

1. A process for producing a hydrogenated polymer or copolymer comprising:
   a) preparing a solution comprising at least one vinyl aromatic monomer and a solvent;
   b) subjecting the solution to polymerization conditions such that the vinyl aromatic monomer polymerizes, forming an aromatic polymer solution of an aromatic polymer and a solvent;

c) optionally, purifying the aromatic polymer solution, and d) subjecting the aromatic polymer solution to hydrogenation conditions in the presence of a silica supported metal hydrogenation catalyst or a mixed hydrogenation catalyst comprising a mixture of at least two components, wherein the first component is any metal which will increase the rate of hydrogenation and the second component is deactivation resistant component; such that aromatic hydrogenation is achieved, wherein the aromatic polymer is not isolated prior to hydrogenation.

2. The process of claim 1 wherein the vinyl aromatic monomer is styrene.

3. The process of claim 1 wherein the vinyl aromatic monomer is polymerized in the presence of an additional comonomer selected from the group consisting of nitrites, acrylates, acids, ethylene, propylene, maleic anhydride, maleimides, vinyl acetate, vinyl chloride and conjugated dienes.

4. The process of claim 3 wherein the additional comonomer is a conjugated diene.

5. The process of claim 4 wherein the conjugated diene is butadiene.

6. The process of claim 1 wherein the aromatic polymer is a block copolymer of styrene and butadiene.

7. The process of claim 3 wherein the conjugated diene is isoprene.

8. The process of claim 7 wherein the aromatic polymer is a block copolymer of styrene and isoprene.

9. The process of claim 1 wherein the solvent is selected from a saturated hydrocarbon solvent or ether, cyclohexane, methylcyclohexane, ethylcyclohexane, cyclooctane, cycloheptane, dodecane, dioxane, a branched hydrocarbon, isopentane, decahydronaphthalene or mixtures thereof.

10. The process of claim 1 wherein the polymer solution is purified using an activated alumina bed.

11. The process of claim 1 wherein the hydrogenation conditions comprise the use of a Pt silica supported hydrogenation catalyst.

12. The process of claim 1 wherein aromatic hydrogenation is from 20 to 100 percent.

13. The process of claim 10 wherein aromatic hydrogenation is at least 80 percent.

* * * * *